US011557191B2

(12) United States Patent
Wan

(10) Patent No.: US 11,557,191 B2
(45) Date of Patent: Jan. 17, 2023

(54) BAGGAGE ALERT LOCK

(71) Applicant: Edgar Yee Kuo Wan, Toronto (CA)

(72) Inventor: Edgar Yee Kuo Wan, Toronto (CA)

( * ) Notice: Subject to any disclaimer, the term of this patent is extended or adjusted under 35 U.S.C. 154(b) by 0 days.

(21) Appl. No.: 17/166,565

(22) Filed: Feb. 3, 2021

(65) Prior Publication Data

US 2021/0241601 A1 Aug. 5, 2021

Related U.S. Application Data

(60) Provisional application No. 62/969,511, filed on Feb. 3, 2020.

(51) Int. Cl.
*H04N 5/44* (2011.01)
*G08B 21/24* (2006.01)
*A45C 13/42* (2006.01)

(52) U.S. Cl.
CPC .............. *G08B 21/24* (2013.01); *A45C 13/42* (2013.01)

(58) Field of Classification Search
CPC ......... G08B 21/24; A45C 13/42; A45C 13/18; A45C 13/24
See application file for complete search history.

(56) References Cited

U.S. PATENT DOCUMENTS 4,593,273 A * 6/1986 Narcisse ............ G08B 21/0236 340/505
7,932,812 B2 * 4/2011 Nerat ................... G06K 7/0008 340/539.1
8,847,754 B2 * 9/2014 Buchheim ............... G01S 1/725 455/457
10,552,927 B2 * 2/2020 Dange .................... G06Q 50/14
10,745,150 B2 * 8/2020 Lykkegaard ............ B64F 1/368
2010/0069047 A1 * 3/2010 Mehmet ................. G01V 15/00 455/414.1
2011/0148625 A1 * 6/2011 Velusamy ............. H04W 4/029 340/539.13
2015/0029024 A1 * 1/2015 Outwater ........... G08B 21/0286 340/539.13

(Continued)

*Primary Examiner* — Munear T Akki
(74) *Attorney, Agent, or Firm* — Lawrence Chan; Oyen Wiggs Green & Mutala LLP

(57) ABSTRACT

A method for tracking pieces of baggage comprises the steps of providing one or more first devices, each of the first devices being attached to the pieces of baggage and each of the first devices comprising a first transceiver; transmitting, by each of the first transceivers, wireless data, the wireless data comprising a device identifier for the respective first device; providing a second device, the second device comprising a second transceiver and a user interface; receiving, by the second transceiver, the wireless data from one or more of the first transceivers; displaying on the user interface the device identifiers corresponding to the respective first devices from which the wireless data was received; selecting one or more of the device identifiers, the selected one or more of the device identifiers corresponding to the first devices that are selected for tracking; and generating, by the second device, an alarm if one of the first devices that are selected for tracking moves beyond a particular distance from the second device, wherein the particular distance may be determined using a signal strength of the wireless data received by the second transceiver.

12 Claims, 2 Drawing Sheets

(56) References Cited

U.S. PATENT DOCUMENTS

| | | | | |
|---|---|---|---|---|
| 2015/0242665 | A1* | 8/2015 | Antonescu | G06K 7/10356 340/8.1 |
| 2015/0322693 | A1* | 11/2015 | Levine | H04W 4/029 70/51 |
| 2016/0189507 | A1* | 6/2016 | Rayner | A45C 13/18 340/572.1 |
| 2016/0360351 | A1* | 12/2016 | Cabouli | H04M 1/72412 |
| 2021/0150879 | A1* | 5/2021 | Mann | G08B 21/0227 |

* cited by examiner

BAGGAGE ALERT LOCK

CROSS-REFERENCE TO RELATED APPLICATIONS

This application claims the benefit of U.S. provisional patent application No. 62/969,511 filed Feb. 3, 2020.

FIELD OF THE INVENTION

The present invention relates to baggage alert devices for baggage, and in particular, to locks that allow for easier identification of the baggage during pickup.

BACKGROUND OF THE INVENTION

Nowadays, air travel is a very common occurrence. During flight, the baggage of the passengers is typically stored separate from the passenger cabin. After landing, the passengers must retrieve their baggage, typically from a common baggage retrieval area in the airport. The baggage may be delivered to the common baggage retrieval area using conveyor belts, with the passengers manually picking up their baggage when they see it. This can cause confusion since the design and appearance of many baggage pieces look similar. In addition, depending on the number of passengers on the flight and/or the general level of activity at the airport, the common baggage retrieval area may be quite crowded, as the passengers jockey about to identify their baggage near the conveyor belts. It is therefore quite possible for a passenger to mistakenly take baggage belonging to another passenger.

There is therefore a need to improve the identification of one's baggage by passengers to reduce the likelihood of a passenger taking the wrong baggage. In addition, there is also a need to decrease the amount of overcrowding near the conveyor belts as the passengers' baggage is being delivered.

SUMMARY OF THE INVENTION

In accordance with one embodiment of the invention, a system for identifying passenger baggage comprises one or more locks and one or more communication devices. The lock may be built into the baggage or be a separate unit to lock the baggage. The communication device may be embodied as a separate unit or as a software application running on a smartphone, a tablet, a laptop computer, a smartwatch or the like. Both the lock and the receiver have the ability to receive wireless communications through cellular network, Wifi, Bluetooth and/or other technology.

Each of the locks has a unique identifier, which is captured by the communication device when in use. Once the lock is on the conveyor belt and within a preset distance from the receiver, a signal from the lock is picked up by the communication device. The communication device is configured to perform the following: (1) record the time when the signal is picked up (e.g. 50 feet or a pre-set distance from the lock; (2) a light on the lock will be turned on once the signal is received by the communication device; (3) upon receipt of the signal(s), the communication device will display all the identifiers of the locks that are within the pre-set distance; and (4) if the lock is moved out of the pre-set range, a flashing light on the lock will illuminate.

If a piece of baggage with the lock is mistakenly picked up by someone and moves out of the pre-set range, the identifier will no longer be displayed by the receiver. At that time, receiver may be configured to cause the light to flash, drawing attention of the person that has mistakenly taken the wrong baggage.

In one aspect of the invention, a method for tracking pieces of baggage comprises the steps of providing one or more first devices, each of the first devices being attached to the pieces of baggage and each of the first devices comprising a first transceiver; transmitting, by each of the first transceivers, wireless data, the wireless data comprising a device identifier for the respective first device; providing a second device, the second device comprising a second transceiver and a user interface; receiving, by the second transceiver, the wireless data from one or more of the first transceivers; displaying on the user interface the device identifiers corresponding to the respective first devices from which the wireless data was received; selecting one or more of the device identifiers, the selected one or more of the device identifiers corresponding to the first devices that are selected for tracking; and generating, by the second device, an alarm if one of the first devices that are selected for tracking moves beyond a particular distance from the second device, wherein the particular distance may be determined using a signal strength of the wireless data received by the second transceiver.

In another aspect of the invention, the first device further comprises a locking mechanism for securing contents of the piece of baggage.

In still another aspect of the invention, the first device further comprises a light, In a further aspect of the invention, the method further comprises transmitting, by the second device, the alarm to the one of the first devices; and receiving, by the one of the first devices, the alarm.

In still yet a further aspect of the invention, the method further comprises upon receiving by the one of the first devices the alarm, the one of the first devices illuminating a light located on an exterior of the one of the first devices.

In another aspect of the invention, a system for tracking pieces of baggage comprises one or more locks and a communications device. Each of the one or more locks is removably attached to the pieces of baggage, and each of the locks comprises a first transceiver and a locking mechanism configured for securing contents of the pieces of baggage. The communication device comprises a user interface for displaying information and a second transceiver configured to communicate wirelessly with one or more of the first transceivers. Each of the first transceivers is configured to transmit data, the data comprising a lock identifier for the respective lock. The second transceiver is configured to receive data from one or more of the first transceivers. The communication device is configured to display on the user interface the lock identifiers corresponding to the respective locks from which data was received. The user interface is configured to accept input regarding a selection of one or more of the lock identifiers displayed on the user interface, the selection corresponding to the respective locks selected for tracking. The communication device is further configured to generate an alarm if one of the locks selected for tracking moves beyond a particular distance, the particular distance determined using a signal strength of the data received by the second transceiver.

In still another aspect of the invention, the communication device is further configured to transmit the alarm to the lock that is moved beyond the particular distance.

In still yet another aspect of the invention, each of the locks further comprises a light located on an exterior of the lock.

In a further aspect of the invention, each of the locks is further configured to, upon receipt of the alarm, cause illumination of the light.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which.

DETAILED DESCRIPTION OF THE INVENTION

Figure 1:
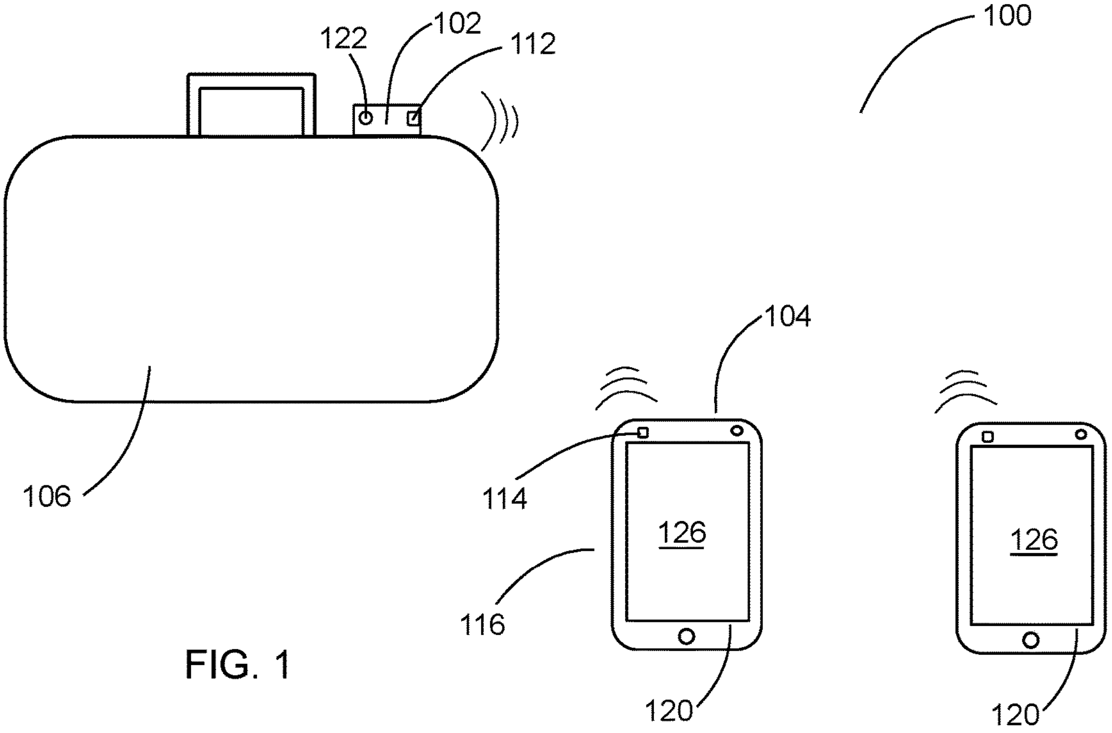
FIG. 1 depicts the system in accordance with the invention.

Referring to FIG. 1, in accordance with one embodiment of the invention, a system 100 for identifying baggage comprises one or more locks 102 and one or more communications devices 104. The lock 102 preferably may be attached to a piece of baggage 106. The baggage 106 may include luggage, suitcases, briefcases, backpacks, or the like. The lock 102 may be removably attached to the baggage 106 and may be used to secure the contents of the baggage 106. Alternatively, the lock 102 may be integrally built into the baggage 106.

Figure 2:
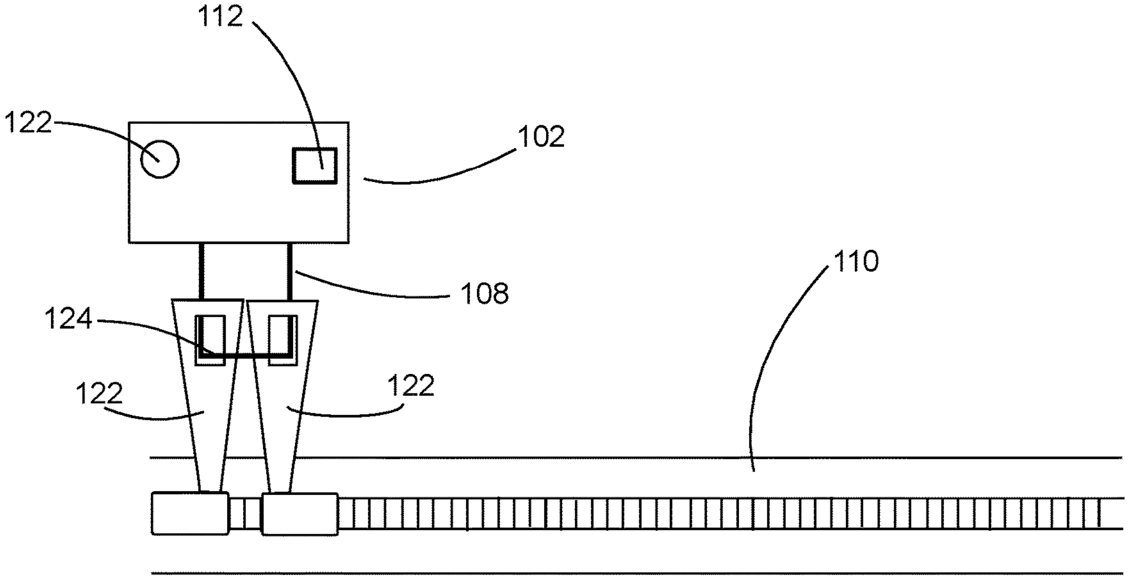
FIG. 2 depicts one of the locks of the system.

Referring to FIG. 2, the lock 102 comprises a locking mechanism 108 that prevents unauthorized opening of the baggage 106. For example, if the baggage 106 includes a zipper 110 with pullers 122, the locking mechanism 108 may comprise a bar 124 that secures the pullers 122 together so as to prevent the pullers 122 from moving apart when the locking mechanism 108 is in the locked configuration. This prevents the zipper 110 from being opened (thereby restricting access to and/or hiding the contents of the baggage 106). When the locking mechanism 108 is in the unlocked configuration, the bar 124 no longer secures the pullers 122 together, thus allowing the zipper 110 to be opened and allowing access to the contents of the baggage 106. Other mechanisms for securing the baggage 106 by the locking mechanism 108 may also be used, depending on the fastening mechanism(s) used by the baggage 106. The locking mechanism 108 may use one or more mechanisms for going from the locked configuration to the unlocked configuration, including the use a physical key, the use of a combination code, the use of a fingerprint scanner, and/or the use of face recognition.

The lock 102 further comprises a first transceiver 112 for sending and receiving wireless communications.

Each of the communication devices 104 comprises a second transceiver 114. The communication devices 104, using the second transceivers 114, may be able to communicate wirelessly with the locks 102, using the first transceivers 112. The first and second transceivers 112, 114 may be able to communicate wirelessly with each other through a wireless communication protocol, such as cellular network, Wi-Fi, Bluetooth, or the like.

In one embodiment, the communication devices 104 may be a mobile device 116, such as a smartphone, a tablet, a laptop computer, a smartwatch, etc., with a software application 126 configured to run on the mobile device 116. The software application 126 may be further configured to effect the operation of the second transceiver 114.

Each of the locks 102 is associated with a lock identifier 118 that is preferably unique to the particular lock 102. The lock identifier 118 may be an alphanumeric string or some other unique sequence. The lock identifier 118 may be configured by the user beforehand so that it is more recognizable by the user. When the system 100 is in operation, each of the locks 102 will transmit its corresponding unique lock identifier 118 through their respective first transceivers 112. Each of the communication devices 104, through their respective second transceiver 114, are able to detect wireless communications from any of the locks 102 that are within wireless communications range of their respective second transceivers 114.

Figure 3:
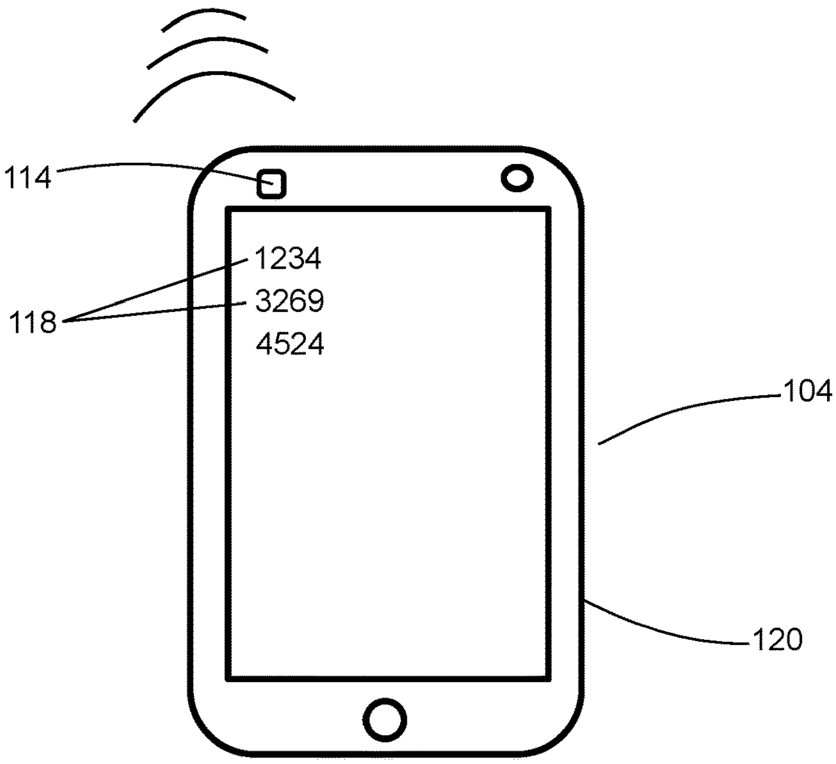
FIG. 3 depicts one of the communication devices of the system.

Preferably, each of the communication devices 104 comprises a user interface 120 that is configured to display information to the user. For example, if one of the communication devices 104 detects communications from one or more of the locks 102, the communication device 104 may be configured to display on the user interface 120 the lock identifier(s) 118 of the lock(s) 102 within wireless communications range of the communication device 104. Alternatively, the communication device 104 may be configured to only display on the user interface 120 the lock identifier(s) 118 of the lock(s) 102 within a certain pre-set range (which is less than the wireless communications range of the communication device 104). For example, the pre-set range may be set by the user to be 50 feet or some other pre-set distance. A distance between the communication device 104 and the lock 102 may be determined by the communication device 104 using the signal strength of the communications received by the second transceiver 114. If the lock identifiers 118 comprise alphanumeric strings, the lock identifiers 118 may be displayed on the user interface 120 as a list of alphanumeric strings, as shown in FIG. 3. The time at which the communications from the lock 102 is first received by the communication device 104 may be recorded by the communication device 104.

The lock 102 may also comprise a light 122 located on an exterior of the lock 102. Preferably, the light 122 is configured to illuminate if one of the communication devices 104 is able to detect the lock identifier 118 of the lock 102. In this embodiment, if one of the communication devices 104 detects wireless communications from the lock 102, the communication device 104 is configured to transmit a signal (through the second transceiver 114) to the first transceiver 112 of the lock 102. Upon receipt of the signal by the first transceiver 112, the lock 102 is configured to cause the light 122 to illuminate, thus allowing for easier identification of the associated baggage 106. In another embodiment, the communication device 104 may be configured to transmit a signal to the lock 102 only if the lock 102 is within a certain pre-set range.

Once the communication device 104 has detected one or more of the lock identifiers 118 of their respective locks 102 and displayed the one or more lock identifiers 118 on the user interface 120, the user may select to track one or more of the locks 102. The user may do so by selecting their respective lock identifiers 118 on the user interface 120. Once one or more of the lock identifiers 118 have been selected, the presence of their respective locks 102 may be tracked. In one embodiment, the light 122 of the lock 102 is not illuminated until after the respective lock identifier 118 for the lock 102 has been selected by the user. This will cause only the lock(s) 102 selected by the user (and presumably of interest to the user) to be illuminated, rather than all of the locks 102 within communications range.

Figure 4:
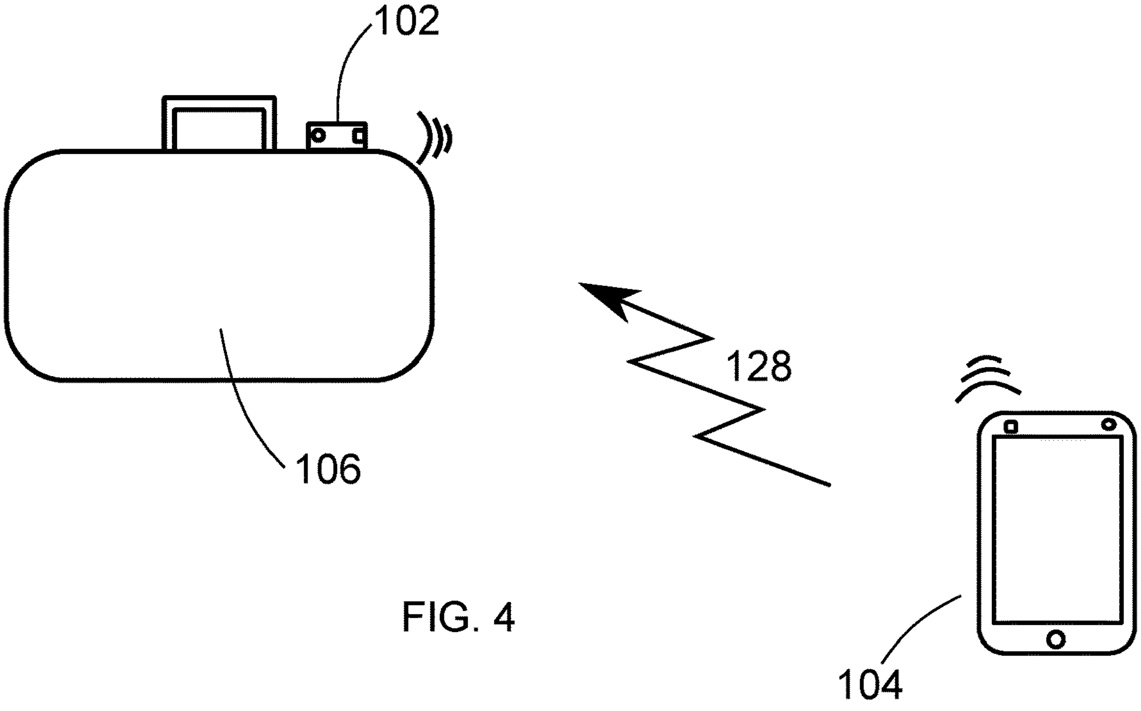
FIG. 4 depicts the operation of the system of FIG. 1.

Referring to FIG. 4, in the event that the baggage 106 with the lock 102 is (for example, mistakenly) removed and taken beyond a certain pre-set distance of the communication device 104, an alarm 128 will be generated by the communication device 104. This may cause the communication device 104 to transmit the alarm 128 to the lock 102 to indicate that the lock 102 is out of the pre-set distance. The pre-set distance may be configured by the user and may be the same or different from the pre-set range described above (for displaying the lock identifiers 118 on the user interface 120). A distance between the communication device 104 and the lock 102 may be determined by the communication device 104 using the signal strength of the communications received by the second transceiver 114. Alternatively, the lock 102 may be configured to generate the alarm 128 if the first transceiver 112 detects that it is no longer in wireless communications with the communication device 104.

In either case, once the lock 102 is aware of the alarm 128, the lock 102 may cause the light 122 to continually flash, thereby alerting the person taking the baggage 106 that he or she may be taking someone else's baggage. Once the communication device 104 is aware of the alarm 128, the communication device 104 may cause the user interface 120 to display an appropriate message to the user.

In another embodiment, the lock 102 may also comprise a siren 124 that is configured to emit noise when the lock 102 is aware of the alarm 128.

The user interface 120 may also be configured to no longer display the lock identifier 118 of the lock 102 if it is out of the pre-set range or, alternatively, out of wireless communications range of the communication device 104.

Although the lock 102 may be used to physically secure the contents of the baggage 106 (e.g. by attachment to the zipper 110), it is understood that the lock 102 may also take the form of a device that is attached to the baggage 106 but does not provide any physical securing of the contents. In such an embodiment, the lock 102 may simply be a tag, a name card holder, or some other similar attachment.

The lock 102 preferably comprises a power source 130 configured to provide electrical power to the components of the lock 102 (e.g. the first transceiver 112 and the light 122). The power source 130 may be a battery. In one embodiment, the lock 102 is configured to cause the light 122 to illuminate when the power source 130 is low on power. For example, the lock 102 may be configured to cause the light 122 to illuminate with a specific color (e.g. red) when the power source 130 is low on power.

It will be appreciated by those skilled in the art that the preferred embodiments have been described in some detail but that certain modifications may be practiced without departing from the principles of the invention.

The invention claimed is:

1. A method for tracking pieces of baggage, the method comprising the steps of:

providing one or more first devices, each of the first devices being attached to the pieces of baggage and each of the first devices comprising a first transceiver and a light located on an exterior of the first device;

transmitting, by each of the first transceivers, wireless data, the wireless data comprising a device identifier for the respective first device;

providing a second device, the second device comprising a second transceiver and a user interface;

receiving, by the second transceiver, the wireless data from one or more of the first transceivers;

transmitting, by the second transceiver, a signal to the one or more of the first transceivers, the signal configured to cause the light on each of a corresponding one or more of the first devices to illuminate to provide visual identification of the one or more of the first devices;

displaying on the user interface the device identifiers corresponding to the respective first devices from which the wireless data was received;

selecting, using the user interface, one or more of the device identifiers, the selected one or more of the device identifiers corresponding to the first devices that are selected for tracking; and generating, by the second device, an alarm if one of the first devices that are selected for tracking moves beyond a particular distance from the second device, wherein the particular distance is determined using a signal strength of the wireless data received by the second transceiver.

2. The method of claim 1, wherein the first device further comprises a locking mechanism for securing contents of the piece of baggage.

3. The method of claim 1, further comprising the steps of:

transmitting, by the second device, the alarm to the one of the first devices; and receiving, by the one of the first devices, the alarm.

4. The method of claim 3, further comprising the step of:

upon receiving the alarm by the one of the first devices, the one of the first devices is configured to cause the light to flash.

5. A system for tracking pieces of baggage, the system comprising:

one or more locks, wherein each of the one or more locks being removably attached to the pieces of baggage, and wherein each of the locks comprises:

a first transceiver;

a light located on an exterior of the lock; and a locking mechanism configured for securing contents of the pieces of baggage; and a communication device comprising:

a user interface for displaying information; and a second transceiver configured to communicate wirelessly with one or more of the first transceivers;

wherein each of the first transceivers is configured to transmit data, the data comprising a lock identifier for the respective lock;

wherein the second transceiver is configured to receive data from one or more of the first transceivers and to transmit a signal to the one or more of the first transceivers, the signal configured to cause the light on each of a corresponding one or more of the first locks to illuminate to provide visual identification of the one or more of the first locks;

wherein the communication device is configured to display on the user interface the lock identifiers corresponding to the respective locks from which data was received;

wherein the user interface is configured to accept input regarding a selection of one or more of the lock identifiers displayed on the user interface, the selection corresponding to the respective locks selected for tracking; and wherein the communication device is further configured to generate an alarm if one of the locks selected for tracking moves beyond a particular distance, the particular distance determined using a signal strength of the data received by the second transceiver.

6. The system of claim 5, wherein the communication device is further configured to transmit the alarm to the lock that is moved beyond the particular distance.

7. The system of claim 6, wherein the lock that is moved beyond the particular distance is further configured to, upon receipt of the alarm, cause the light to flash.

8. The method of claim 1, wherein the first devices are removably attached to the pieces of baggage.

9. The method of claim 1, wherein the first devices are integrally attached to the pieces of baggage.

10. The method of claim 3, wherein each of the first devices comprises a siren.

11. The method of claim 10, further comprising the step of:

upon receiving the alarm by the one of the first devices, the one of the first devices is configured to cause the siren to sound.

12. The system of claim 6, wherein the each of the locks further comprises a siren, and wherein the lock that is moved beyond the particular distance is further configured to, upon receipt of the alarm, cause the siren to sound.

* * * * *